United States Patent Office 3,752,728
Patented Aug. 14, 1973

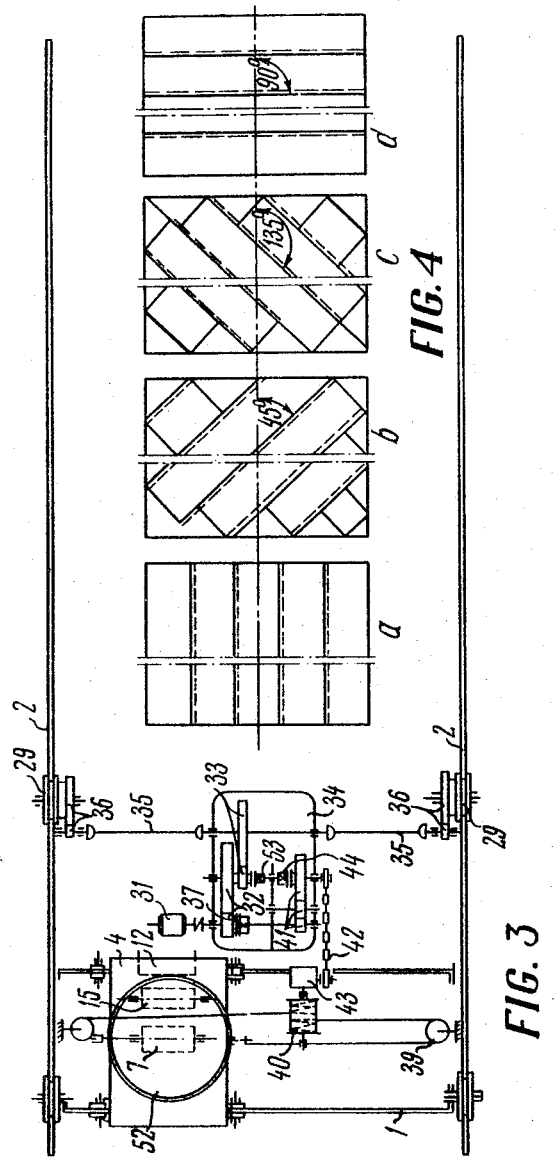

3,752,728
DEVICE FOR MOLDING SHEETS OF GLASS-REINFORCED PLASTICS
Vasily Ivanovich Smirnov, deceased, late of Leningrad, U.S.S.R., by Viktoria Stanislavovna Smirnova, ulitsa Frunze 15, kv. 101, and Valery Vasilievich Smirnov, Vitebsky prospekt 23, korpus 3, kv. 107, both of Leningrad, U.S.S.R., administrators; and Yakov Veniaminovich Epshtein, ulitsa Mayakovskogo 10, kv. 10; Solomon Grigorievich Ginzburg, Bulvar Novatorov 35, kv. 21; Sergei Mikhailovich Ivanov, naberezhnaya r. Fontanki 96, kv. 7; and Nikolai Petrovich Belyaev, Novoizmailovsky prospekt 44, korpus 4, kv. 20, all of Leningrad, U.S.S.R.
Filed Apr. 17, 1970, Ser. No. 29,604
Int. Cl. B32b 31/08, 31/20
U.S. Cl. 156—577
2 Claims

ABSTRACT OF THE DISCLOSURE

A device for molding sheets of glass-reinforced plastics having a bridge truss movable in the direction transverse to the truss span and a carriage moving along the truss. Secured on the carriage is a molding head with means for laying, and densifying the sheets of a glass reinforcing material and for impregnating them with binders. The device has with means for providing for a simultaneous movement of the bridge truss and carriage at speeds being in a predetermined ratio, while the molding head is secured on the carriage with the possibility of turning about a vertical axis and fixing in a required direction.

---

The present invention relates to equipment for working glass-reinforced plastic materials and, more specifically, the invention relates to devices for molding sheets of glass-reinforced plastics for the purpose of producing high-strength structural members used in various industries such as shipbuilding, the manufacture of automobiles and carriages, building construction, etc.

Known in the art is a device for molding sheets of glass-reinforced plastic comprising a bridge truss movable in a direction transverse to its span and a suspended carriage moving along the truss and having a molding head with arrangements for laying and densifying fiberglass sheets and for impregnating them with binders.

In operation, the bridge truss is installed in an initial position above the stationary mold, on which the fibreglass sheets are to be laid-up, impregnated and densified. During the movement of the suspended carriage along the truss, the molding arrangements carry out the molding of the first fibreglass sheet. After passing over the whole length of the truss, the carriage stops, and the molded fibreglass sheet is cut off from the roll of the fibreglass. Then the bridge truss is moved by the width of the fibreglass and the carriage, effecting a back idle stroke, and returns to the initial position for molding an adjacent fibreglass sheet in the first layer of the reinforced-glass plastic sheeting. The next adjacent sheets of fiberglass in the first layer of the sheeting are molded in a similar way. After completing the process of molding the first layer, all other layers of the sheeting of glass-reinforced plastics are molded.

This known device has a limited field of application because it does not make it possible to mold sheets having complex structures of reinforcement wherein the sheets of fibreglass are laid within adjacent layers so that the warp threads are positioned at various desired angles to the main direction of reinforcement of the structures (for example structures with longitudinal, diagonal and transverse reinforcement structures), whereas it is precisely those sheets having a complex structure of reinforcement with an equal strength in all directions which are needed for large-sized, demanding and highly-loaded structures (decks, partitions, sheathing of large ships, automobile bodies, aircraft fuselages, etc.).

In addition, known devices are disadvantageous in that their operation is associated with high consumption of time for the idle strokes of the carriage and have a limited maneuverability. Moreover, devices of the known type occupy a large production area.

An object of the present invention is to provide a device for molding sheets of glass-reinforced plastics, in which the molding head makes it possible to mold sheets of glass-reinforced plastics having various types of reinforcement, i.e. longitudinal, diagonal and transverse. This provides for the possibility of producing large-sized load-carrying structures of fiberglass which are characterized by an equal strength in all directions and to use fibreglass sheets having a lower thickness compared with sheets having unidirectional structures of reinforcement and this, in turn, makes it possible to save expensive materials, i.e. glass reinforcing compounds and binders, and lighten the constructions.

This object is attained by providing a device for molding sheets of glass-reinforced plastics comprising a bridge truss capable of moving in the direction transverse to truss span and a carriage capable of moving along the truss and having a molding head including means for laying and densifying the sheets of glass reinforcing material and for impregnating the sheets with binders. According to the invention, the device is provided with means providing for a simultaneous movement of the bridge truss and the carriage at predetermined speeds while the molding head is secured on the carriage with the possibility of turning about a vertical axis and fixing in a required position. In order to provide a simultaneous movement of the bridge truss and carriage, it is possible to use a reversible electric motor kinematically connecting the carrier of the bridge truss with the carriage drive mechanism through a reduction gear and a system of electric clutches.

The invention will be further described by way of example with reference to the accompanying drawings, in which:

FIG. 3 is a top plan of a drive for the bridge truss and carriage according to the invention; and FIGS. 4a, b, c, and d are diagrams illustrating sheets with different possible reinforcement structures produced by means of the device for molding sheets of glass-reinforced plastics according to the invention.

Figure 1:
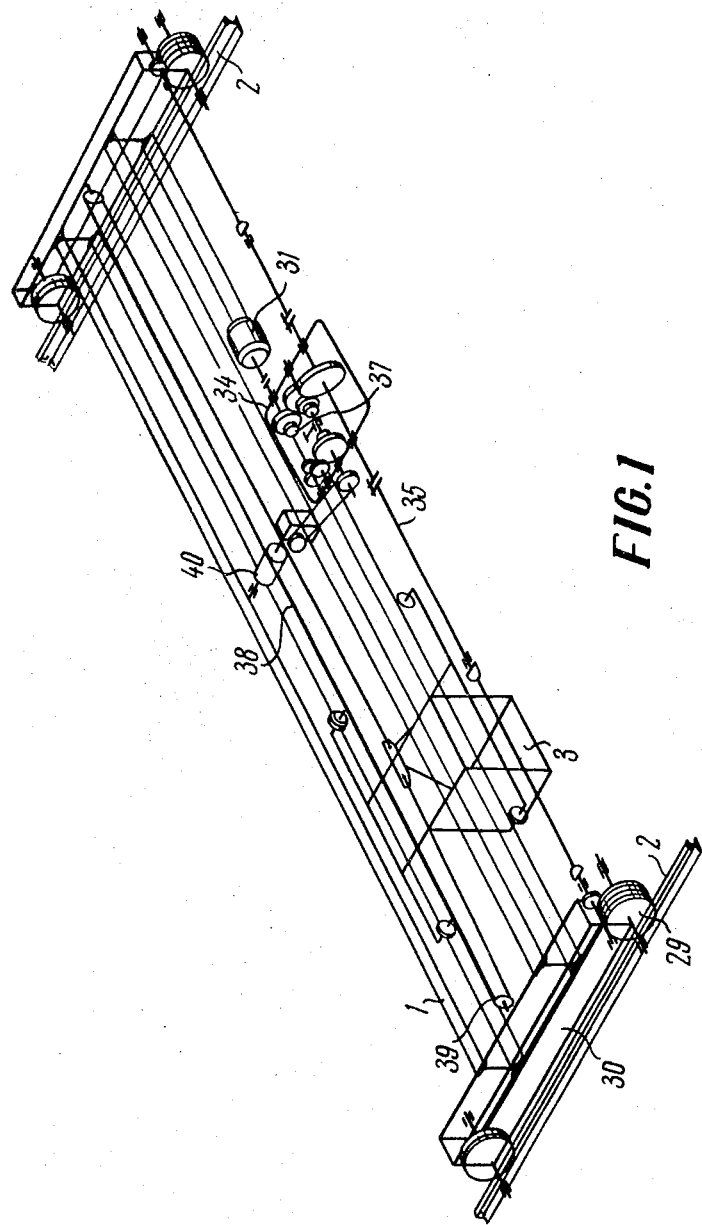
FIG. 1 is a schematic illustration of a device, in perspective view, for molding sheets of glass-reinforced plastics according to the invention.
Figure 2:
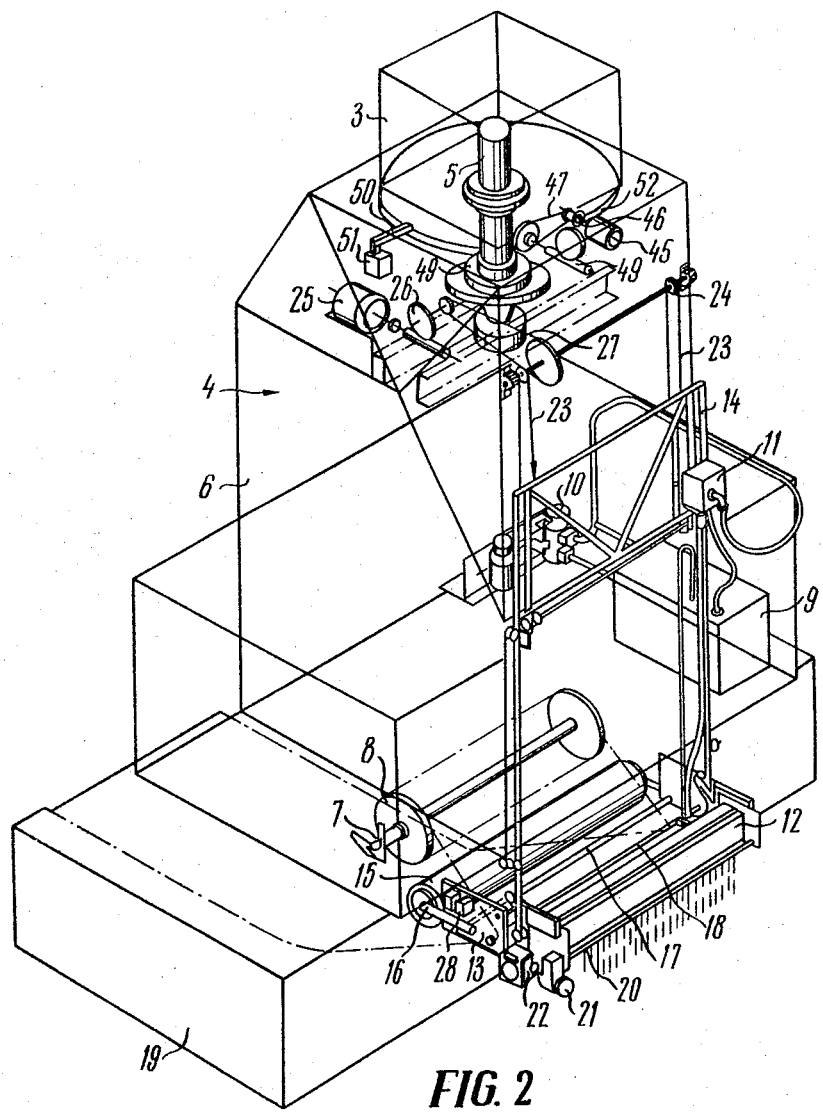
FIG. 2 is a schematic perspective of a molding head according to the invention.

The illustrated device for molding sheets of glass-reinforced plastics includes a bridge truss (FIG. 1) moving along tracks 2. Moved along the beams of the bridge truss 1 is a carriage 3 with a molding head 4 (FIG. 2) capable of turning about a vertical axle 5 rigidly secured on the carriage 3. Secured on the housing 6 of the molding head 4 are supporting members 7 for reels 8 fibreglass of separating materials, a tank 9 for binders (resins with solidifying additions), a pump 10 for pumping the binder, a funnel 11 which can be secured on the housing 6 at different heights so as to provide the required liquid head for a sprayer 12. The sprayer 12 and a device 13 for laying and densifying the fibreglass sheets are secured on a frame 14 which is also capable of moving in a vertical direction relative to the housing 6 of the molding head 4. The device 13 for laying and densifying the sheets includes an elastic smoothing roller 15 which together with a lever 16 turns about a stationary axle 17 of the frame 14. A deflecting widening roller 18 is used for melting the folds in the sheets of fibreglass being laid-up and for directing the sheet under the smoothing roller 15. The fibreglass sheets are laid-up on a mold 19 and are impregnated with a binder. In order to determine the best parameters for laying the binder, for example the specific quantity of binder per unit of the surface, for the purpose of obtaining the optimum relation between the glass and binder in the glass-reinforced plastics, the sprayer 12 can move along the frame 14, while going up and down above the surface of mold 19 depending on the viscosity of the binder, the rate of applying the binder and the other factors.

The slot of the sprayer 12 through which the binder flows in the form of a continuous curtain is provided with a valve 20. The valve 20 may be made in the form of a clamping elastic rule capable of opening and closing automatically by means of an electric motor 21 and a worm gear 22.

For providing the possibility of molding curvilinear sheets of a double curvature (concave-convex), the sprayer 12 and the device 13 for laying and densifying the sheets are held at a constant distance from the surface of the mold 19 regardless of its configuration. For this purpose, the frame 14, on which there are mounted the said devices, is lifted or lowered. The frame 14 is suspended from the housing 6 through two chains 23 which passed over the sprocket 24 and is capable of moving along the guides (not shown) in a vertical direction with the help of a special drive consisting of an electric motor 25, a reduction gear 26 and a chain drive 27.

The smoothing roller 15, while turning on levers 16 about the stationary axle 17 secured on the frame 14, acts upon a microswitch 28 interacting with the levers 16 and controlling the lift and descent of the frame 14 effected with the help of the electric motor 25.

In the proposed device, the molding head 4 can move in any prescribed direction relative to the main direction of reinforcement of the sheets. This is provided by means of simultaneous movement of the bridge truss 1 (FIG. 1) and the carriage 3, on which is secured the molding head 4 (FIG. 2), at speeds which are in a predetermined ratio and also by means of a fixed turning of the molding head 4. For this purpose, the driving wheel 29 (FIG. 1) mounted on the carrier 30 of the bridge truss 1 is used for transmitting rotary motion from the reversible electric motor 31 through gear drives 32, 33 (FIG. 3) of a reduction gear 34, transmission shafts 35 and gear drives 36 upon switching on an electromagnetic clutch 37. The movement cf the carriage 3 (FIG. 1) along the beams of the bridge truss 1 is effected by a rope 38 enveloping pulleys 39 and a drum 40. The latter is rotated by the electric motor 31 through a gear drive 41 (FIG. 3), a chain drive 42, and a worm reducer 43 upon the switching on of an electromagnetic clutch 44. The turn of the molding head 4 (FIG. 2) about the vertical axle 5 is effected by means of a drive comprising a reversible electric motor 45, an electromagnetic brake 46, a V-belt drive 47, a worm reducer 48 and a bevel gear drive 49 with a friction clutch. The turning of the molding head 4 can be effected when a stop 50 controlled by an electric magnet 51 is brought out from one of the slots of a dial 42 rigidly connected with the carriage 3. The moulding head 4 can turn relative to the carriage 3 and can be fixed in such a way that the sprayer 12 and the 13 for laying and densifying the fibreglass sheets are turned through any prescribed angle to the main direction of reinforcement of the sheets, for example 0°, 45°, 90°, 135°, 180°, 255°, 270° and 315°.

The device can be controlled by an operator sitting in a cabin (not shown) associated with the molding head 4 or can be provided with a remote control system.

The device for molding sheets of fibreglass operates as follows:

The reel with separating antiadhesive film materials is mounted in the supporting members 7 of the molding head 4. The bridge truss 1 (FIG. 1) with the carriage 3 is set in the initial position above the stationary mold 19 (FIG. 2) and the end of the sheeting of the separating film material is secured along the edge of the mold 19. Then, movement of the bridge truss 1 (FIG. 1) with the carriage 3 is started, the molding head 4 (FIG. 2) being installed relative to the carriage 3 so that the sheet is laid on the mold 19 in the main direction of reinforcement of the fibreglass sheet.

For this purpose, the electromagnetic clutch 37 (FIG. 3) is switched on and the rotation from the electric motor 31 is transmitted to the driving wheels 29 of the carrier 30 (FIG. 1) of the bridge truss through the gear drives 32, 33 (FIG. 3), transmission shafts 35 and gear drive 37. After the movement of the bridge truss 1 (FIG. 1) with the molding head 4 (FIG. 2) for the length of the mold 19, the device is stopped and the laid sheet of the separating film material is cut off from the reel 8. The molding head 4 is transferred to the initial position for laying an adjacent sheet of the separating material. This is effected by switching on the electromagnetic clutch 44 (FIG. 3) and by switching on the reversible electric motor 31 in the required direction of rotation. In this case the clutches 44 and 53 are not switched on. The rotation of the electric motor 31 is transmitted to the drum 40 through the transmission 41, 42 and the reducer 43.

After that, the electric motor 45 (FIG. 2) of the mechanism for turning the molding head 4 and the electric magnet 51 of the stop 50 are switched on.

In this case, the molding head 4 due to the V-belt transmission 47 and reduction gear 48 and due to the bevel gear drive 49 is turned for a required angle, in the given case through 180°, the electric magnet 51 is switched off and the stop 50 enters the slots of the dial 52. Thus, the molding head is prepared for the next movement. The adjacent sheet of the separating film material is secured on the edge of the mold 18. During the back stroke the bridge truss 1 (FIG. 1) with the molding head 4 (FIG. 2) is laid on the adjacent sheet on the separating material with a small overlap (10–15 mm.), further operations being effected in a similar way. After the laying all sheets of the separating film material on the mold 19, the reel 8 with the separating material is removed from the supporting members 7 of the molding head 4. The reel 8 with fibreglass in installed into the supporting members 7.

The bridge truss 1 (FIG. 1) and the carriage 3 with the molding head 4 (FIG. 2) are installed in the initial position for laying the extreme sheets of fibreglass on the mold 19. The binder is forced by the pump 10 into the working tank 9. The end of the fibreglass sheet is passed through the deflecting widening roller 18 and smoothing roller 15 and is secured on the edge of the mold 19. The frame 14 with the smoothing roller 15 is lowered until the roller 15 contacts the mold 19. The pump 10 is operated which feeds the binder into the funnel 11 and therefrom into the sprayer 12. During the working stroke of the bridge truss 1 (FIG. 1), and the carriage 3 with the molding head 4 (FIG. 2), the valve 20 of the sprayer 12 is automatically opened by means of the electric motor 21 and the reduction gear 22.

At the same time the binder is fed from the sprayer 12 onto the mold 19 in the predetermined quantities, the dry fibreglass is laid on the poured layer of the binder and the fibreglass impregnated with the binder is densified. After the movement of the molding head for a required distance (depending on the length of the molded surface), the molding head is stopped, and the valve 20 automatically closes the slot of the sprayer 12.

The molder, working at the bottom of the mold 19, cuts off the laid fibreglass sheet from the reel 8 with the help of a portable pneumatic cutter (not shown).

The frame 14 together with the smoothing roller 15 is lifted and the molding head is turned through 180°. Then a transverse (adjusting) movement of the molding head 4 is effected at a low speed and the end of the fibreglass sheet is secured on the edge of the mold 19. In the process of the back stroke of the molding head 4, there is laid, impregnated and densified the next fibreglass sheet abutting the adjacent sheet or overlapping it with a small overlap (2 to 7 mm.).

After molding all the longitudinal sheets of fibreglass within one layer, the molding head 4 is set into a position providing for the molding of the fibreglass in the second layer with a displacement of the edges of the adjacent sheets for a required value.

Then there is effected the operation of molding the second layer of the sheet, the third layer, etc. After molding the longitudinal layers of the fibreglass in which the warp threads are located at an angle of 0° to the main direction of reinforcement (FIG. 4a), the bridge truss 1 and the carriage 3 with the molding head 4 are positioned above the surface of the mold 19 for molding the extreme fibreglass sheets with the direction of the warp threads at an angle of 45° to the main direction of reinforcement of the sheets.

Diagrams showing the fibreglass sheets with the reinforcement structures which can be obtained by means of the device disclosed herein are shown in FIGS. 4a, b, c and d.

The molding head 4 (FIG. 2) is turned through an angle of 45° and is fixed in this position to form the first sheet of the fibreglass of the diagonal layer (FIG. 4b) with the direction of the warp threads at an angle of 45° to the main direction of reinforcement. The laying of the diagonal is effected due to the uniform simultaneous movement of the bridge truss 1 (FIG. 1) and the molding head 4 (FIG. 2) turned through 45° along the bridge truss 1 (FIG. 1) during the operation of the electromagnetic clutches 37, 44 (FIG. 3) and the reversible electric motor 31.

After the molding of the first sheet of the diagonal layer, the bridge truss 1 and the molding head 4 (FIG. 2) are set into the position for the molding of the adjacent sheet. The molding head 5 is turned through an angle of 180°. The third sheet of the diagonal layer is formed and so on.

After molding the necessary amount of the diagonal layers with the direction of the warp threads in the fibreglass at an angle of 45° to the main direction of reinforcement, further molding of the layers is effected, in which the threads of the basic sheets of the fibreglass are located at an angle of 135° to the main direction of reinforcement of the structures (FIG. 4c).

The device also makes it possible to mold the layers with the direction of the warp threads of the sheets of fibreglass at an angle of 90° to the main direction of reinforcement of the structures (FIG. 4b). The process of molding is repeated up to the making of the sheets of a prescribed thickness and of prescribed parallel-diagonal and parallel-transverse structures of the reinforcement. For molding the fibreglass sheets in the longitudinal direction (at an angle of the warp threads equal to 0° to the main direction of reinforcement of the structures), the movement of the bridge truss 1 (FIG. 1) is a laying motion while the movement of the carriage 3 along the bridge truss 1 is a steplike (adjusting) motion. For molding the fibreglass sheets in the transverse direction (at an angle of 90° to the main direction of reinforcement of the structures), the carriage movement is a laying motion while the movement of the bridge truss 1 along the tracks is a step-like (adjusting) motion. On molding the fibreglass in the diagonal directions, the laying motion consists of a simultaneous movement of the bridge truss 1 and the cabin of the molding head 4 turned through an angle of 45° to the main direction of reinforcement, the step-like (adjusting) motion consists of a separated movement of the bridge truss 1 or the carriage 3. The laying motions are effected at maximum speeds (up to 42 m./min.) and the step-like motions are effected at minimum speeds (4 m./min.).

For this purposes, the drive of the device is provided with stepless control of the speed of the bridge truss 1 and molding carriage 3 within a wide range of from 4 to 43 m./min. by using a direct-current electric motor 1 fed from a system "generator-motor" (controlled by means of a voltage change).

After completing the molding of the sheet, the residues of the binder are drained off from the pipelines of the pumping system for circulation of the binder and from the funnel 11 for the binder, the tank 9 for the binder, the sprayer 12 and the pump 10.

These units are filled with a washing solution and are washed for a certain period of time. Thereafter, they are released from the residual washing solution. Thus, the device is prepared for a new cycle of molding.

The basic advantage of the proposed device consists of the fact that a great number of directions of movements of the working tools of the molding head 4 provides for molding equistrong sheets of glass-reinforced plastics with different reinforcement structures. In this case, the sheets obtained by means of the proposed device can be both flat and curved. The curved sheets are produced due to lifting and lowering of the frame 14 above the mold 19 in a vertical direction.

The device is characterized by a good maneuverability, i.e. it makes it possible to mold a sheet at any place in the production area. Idle strokes of the carriage 3 are practically absent. This increases the efficiency of the proposed device as compared with known apparatus of the same kind.

The proposed device allows one to produce sheets with stable and high strength characteristics and also to make monolithic structures of a large size.

We claim:

1. A device for molding sheets of glass-reinforced plastics, comprising in combination: a bridge truss movable in a direction transverse to the span thereof; a carriage capable of moving along said bridge truss; a molding head mounted on said carriage, said molding head being adapted for rotating about a vertical axis and for being fixed in a selected position; means for laying and densifying sheets of a glass-reinforcing material and means for impregnating the same with binders, said means being secured to said molding head; and means providing for a simultaneous movement of said bridge truss and said carriage with said molding head thereon at speeds in a selected ratio.

2. A device as claimed in claim 1, comprising a reduction gear and system of electromagnetic clutches; and wherein the bridge truss includes a carrier and the carriage includes a drive mechanism and wherein said means providing for the simultaneous movement of said bridge truss and said carriage includes a reversible electric motor connecting the carrier of said bridge truss and the drive mechanism of said carriage through said reduction gear and said system of electromagnetic clutches.

References Cited
UNITED STATES PATENTS

| | | | |
|---|---|---|---|
| 3,574,040 | 4/1971 | Chitwood et al. | 156—522 |
| 3,577,297 | 5/1971 | Howard | 156—522 |
| 3,608,878 | 9/1971 | Dreshman | 212—18 |
| 3,522,132 | 7/1970 | Cardis | 156—523 |
| 2,980,264 | 4/1961 | Burt et al. | 212—132 |
| 3,391,873 | 7/1968 | Hardesty | 156—189 X |

BENJAMIN A. BORCHELT, Primary Examiner

J. M. HANLEY, Assistant Examiner

U.S. Cl. X.R.

156—522, 523